(12) United States Patent
Mosaner

(10) Patent No.: US 8,556,285 B2
(45) Date of Patent: Oct. 15, 2013

(54) BELLOWS OF A TRANSITION BETWEEN TWO VEHICLES OF AN ARTICULATED VEHICLE ARTICULATELY CONNECTED TO EACH OTHER

(75) Inventor: Knud Mosaner, Kassel (DE)

(73) Assignee: Hübner GmbH, Kassel (DE)

( * ) Notice: Subject to any disclaimer, the term of this patent is extended or adjusted under 35 U.S.C. 154(b) by 0 days.

(21) Appl. No.: 13/593,122

(22) Filed: Aug. 23, 2012

(65) Prior Publication Data
US 2013/0049325 A1 Feb. 28, 2013

(30) Foreign Application Priority Data

Aug. 24, 2011 (EP) .................................. 11006896

(51) Int. Cl.
*B62D 63/00* (2006.01)
(52) U.S. Cl.
USPC ............................ 280/401; 280/402; 280/403
(58) Field of Classification Search
USPC .......................................... 280/401, 402, 403
See application file for complete search history.

(56) References Cited

U.S. PATENT DOCUMENTS 7,600,772 B2 * 10/2009 Koch et al. .................... 280/401

FOREIGN PATENT DOCUMENTS

| DE | 202005008670 U1 | 10/2006 |
|---|---|---|
| EP | 0830262 A1 | 3/1998 |
| EP | 2149462 A1 | 2/2010 |
| PT | 1741573 A1 | 1/2007 |
| PT | 2149463 A1 | 2/2010 |

OTHER PUBLICATIONS

European Search Report dated Jan. 13, 2012, 5 pages.

\* cited by examiner

*Primary Examiner* — Tony Winner
*Assistant Examiner* — Jacob Knutson
(74) *Attorney, Agent, or Firm* — Gifford, Krass, Sprinkle, Anderson & Citkowski, P.C.

(57) ABSTRACT

A bellows provides a transition for two vehicles of an articulated vehicle, which are articulately connected to each other. The bellows has at least one substantially U-shaped circumferential frame, the substantially U-shaped circumferential frame includes at least one coupling arrangement for attaching a cover shaped as an expansion or concertina bellows, and the at least one coupling arrangement is connected with the substantially U-shaped circumferential frame by way of at least one articulation.

19 Claims, 4 Drawing Sheets

BELLOWS OF A TRANSITION BETWEEN TWO VEHICLES OF AN ARTICULATED VEHICLE ARTICULATELY CONNECTED TO EACH OTHER

CROSS REFERENCE TO RELATED APPLICATIONS

This application claims priority of European Patent Application EP 11 006 896.2-1268, filed Aug. 24, 2011, the contents of which are incorporated herein by reference.

FIELD OF THE INVENTION

The invention relates to a bellows of a transition between two vehicles of an articulated vehicle articulately connected to each other, the bellows having at least one substantially U-shaped circumferential frame, the substantially U-shaped circumferential frame having at least one coupling arrangement for attaching a cover shaped as an expansion or concertina bellows.

BACKGROUND OF THE INVENTION

Articulated vehicles are known from the prior art. Thus rail vehicles that are connected to each other by way of an articulation are known, as well as e.g. articulated buses. In articulated buses, the bellows as part of the transition between the two vehicle parts of an articulated bus is relatively long because of the radiuses of the curves around which it must drive. In this respect, it is provided that the bellows is separated in the middle by a so-called central frame.

The transition not only comprises the bellows but also the bridge that is covered by the bellows in a rail vehicle or the platform in an articulated bus. As has already been explained, the box-shaped bellows encloses at least the transition bridge, though in an articulated bus not only the bridge but also the articulation. Between the transition bridge or the platform in an articulated bus and the side wall of the bellows there is usually a gap. For bridging this gap, a so-called floor-cover or track joint cover is known. Such a track joint cover is configured in an approximately trapezoidal shape in a lateral view and covers the track joint. Such a track joint cover is described for instance in EP 0 830 262 B1.

A split bellows is incidentally also known from this citation, the two bellows halves being separated by the central frame. The track joint cover also exhibits a corresponding separation in the area of the central frame of the bellows. This means that in the area of the central frame of the bellows, the track joint cover has a mounting frame that is configured in an approximately trapezoidal shape. At its end, the mounting frame is connected to the central frame of the bellows. In order to attach the mounting frame for the track joint cover, also called floor cover, the mounting frame comprises respective mounting blocks at each end, which are screwed to the mounting frame on the one hand and with the central frame on the other hand. Such a connection occurs on the central frame at both ends of the mounting frame. This means that the mounting frame is rigidly connected to the central frame. The mounting frame itself, which, in a lateral view, is configured in an approximately trapezoidal shape, consists of individual frame members, which are welded together.

A bellows of an articulated vehicle divided by a central frame is furthermore also known from EP 1741573 B1, the central frame however having a cross beam, which is disposed in the roof area of the central frame and which connects the two sides of the central frame in the area of the lateral wall of the bellows. The connection of the cross beam with the two sides of the central frame hereby occurs by way of brackets disposed on the central frame to which the cross beam is screwed or welded. This connection between the cross beam on the one hand and the central frame of the bellows on the other hand is also configured rigidly.

It is known that an articulated vehicle and here more specifically an articulated bus is exposed to various travel movements. For instance, such a vehicle is exposed to bending, pitching and rolling motions. Bending motions occur when the vehicle drives around a curve, while pitching motions occur when driving over a crest or through a hollow. Rolling motions are caused by a torsion-like twisting relative to each other of the two vehicle parts articulately connected to each other. Additionally, there are of course superimposed motions consisting of a combination of the afore-mentioned types of motion. The consequence is that the bellows must have considerable flexibility. This more specifically applies in the field of buses, since as has already been explained the articulated buses must be able to drive through partly very narrow curves. It has been determined that during superimposed motions, the coupling arrangements disposed on the central frame, namely the mounting frame on the one hand and the cross beam on the other hand strongly move relative to the central frame. Considerable tensions hereby occur in the area of the junction with the central frame, which frequently lead to a destruction of the connection. Furthermore, it must be noted that the buses of individual manufacturers are so different, that the coupling arrangements that have been described above, must be manufactured separately for each series of bellows, depending on the predominant geometrical relations on the central frame. This means that the known disposition of the coupling arrangements on the central frame of the bellows is not only at risk of being damaged but its manufacture and assembly is furthermore also relatively complex.

It has already been pointed out that the connection for receiving the cover surfaces shaped as expansion or concertina bellows for forming the track joint or floor cover in the area of the transition to the central frame occurs by screwing mounting blocks on the mounting frame in the area of the transition to the central frame. The mounting of the mounting frame on the central frame itself hereby occurs by way of screws inserted laterally into the mounting block and the central frame. The screws protrude from the central frame with their screw heads, the consequence being that the bellows rubs against the screw heads in this area, which leads to damage and eventually a destruction of the bellows.

It has furthermore been pointed out that the mounting frame consists of several frame members that are welded together in the shape of a trapeze trapezoid in order to form the mounting frame. The central frame as well as the mounting frame is manufactured with an aluminum alloy. Special suction devices are required when welding aluminum alloys, since the vapors that are produced during welding are harmful to health. The aluminum dusts that are subsequently produced during cleaning must also be sucked away due to the explosion hazard. Such a welded connection is furthermore rigid, the consequence being that, just as with the rigid junction of the mounting frame to the central frame of the bellows, fractures are formed in the mounting frame, here more specifically in the area of the welds.

SUMMARY OF THE INVENTION

The object underlying the invention thus consists in implementing the connection of the coupling arrangements to a frame, more specifically the central frame, in such a manner that the assembly is simplified on the one hand and that on the other hand there is no risk of damage to the mounting frame on the one hand and of the connection of the mounting frame to the central frame on the other hand, and furthermore that the assembly, more specifically of the mounting frame can be implemented more easily. Furthermore, it must be possible to use one and the same mounting frame with bellows of different manufacturers. Additionally a connection of the cross beam with the central frame must occur in such a manner that there is no risk of damage.

In order to solve the object, it is proposed according to the invention, that the at least one coupling arrangement is in connection with the substantially U-shaped circumferential frame by way of at least one articulation. The substantially U-shaped circumferential frame is hereby preferably the central frame of the split bellows. The articulated connection of the mounting frame onto the central frame by means of articulations disposed in the transition from the mounting frame to the central frame causes the mounting frame to be substantially decoupled from the motions of the central frame, for instance during rolling and/or bending motions. This means that there is no risk of fracturing in the area of the connection between the mounting frame on the one hand and the central frame on the other hand. In terms of principle, the same applies to the connection of the cross beam to the central frame. Here too, a decoupling of the motion of the central frame from the motion of the cross beam is substantially achieved by way of the articulated connection of the cross beam to the central frame. As has already been described, the cross beam itself serves on both sides to receive the cover shaped as an expansion or concertina bellows for forming the bellows roof.

According to another feature of the invention, it is provided that the frame members of the mounting frame are in connection with each other by way of articulations. This way, the mounting frame is not only decoupled as such from the motion of the central frame by way of the articulated connection located there, but rather the mounting frame itself is to give in able to a certain extent to the forces acting on it. This means that the risk of damaging the mounting frame is eliminated.

According to a particular feature of the invention, the articulation is configured as a hinged joint. Such a hinged joint is a so-called two dimensional articulations, but it must be pointed out here that three-dimensional articulations such as ball joints can also be used. It is also conceivable to use an articulation made of an elastic material, for instance an elastomer. With respect to the articulation, it is specifically provided that the hinged joint has respectively one hinge part on each side of the hinge element, the hinge part being receivable by the cross-beam, the substantially U-shaped circumferential frame, i.e. more specifically the central frame and the mounting frame, or the frame members. According to another feature, it is provided that the cross beam, the substantially U-shaped circumferential frame and the individual frame members are configured as a rail, the rail having a guide with a C-shaped cross-section at the base of the rail, running parallel to the rail. A guide member of the respective hinge part is held by the C-shaped guide at the base of the rail, the guide member being displaceable but lockable in the C-shaped guide.

BRIEF DESCRIPTION OF THE DRAWINGS

In the following, the invention is exemplarily described in more detail based on the drawings. In the drawings.

DETAILED DESCRIPTION OF THE INVENTION

Figure 1:
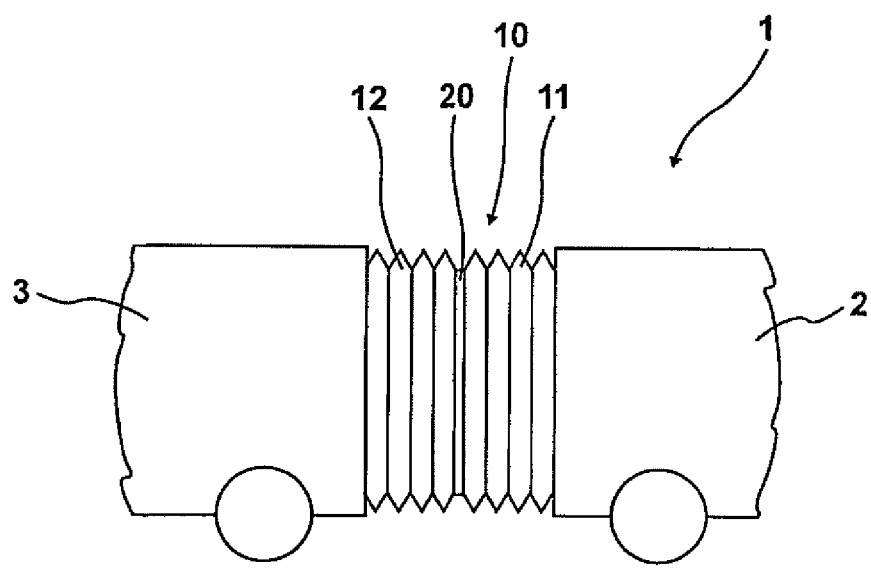
FIG. 1 schematically shows a top view of a split bellows between two vehicles of an articulated vehicle.

According to FIG. 1, the articulated vehicle is labeled 1. The articulated vehicle comprises the two vehicles 2 and 3, which are connected by the bellows labeled 10 as a whole. The bellows 10 comprises the two bellows halves 11 and 12, which connect to each other by way of the central frame labeled 20.

Figure 2:
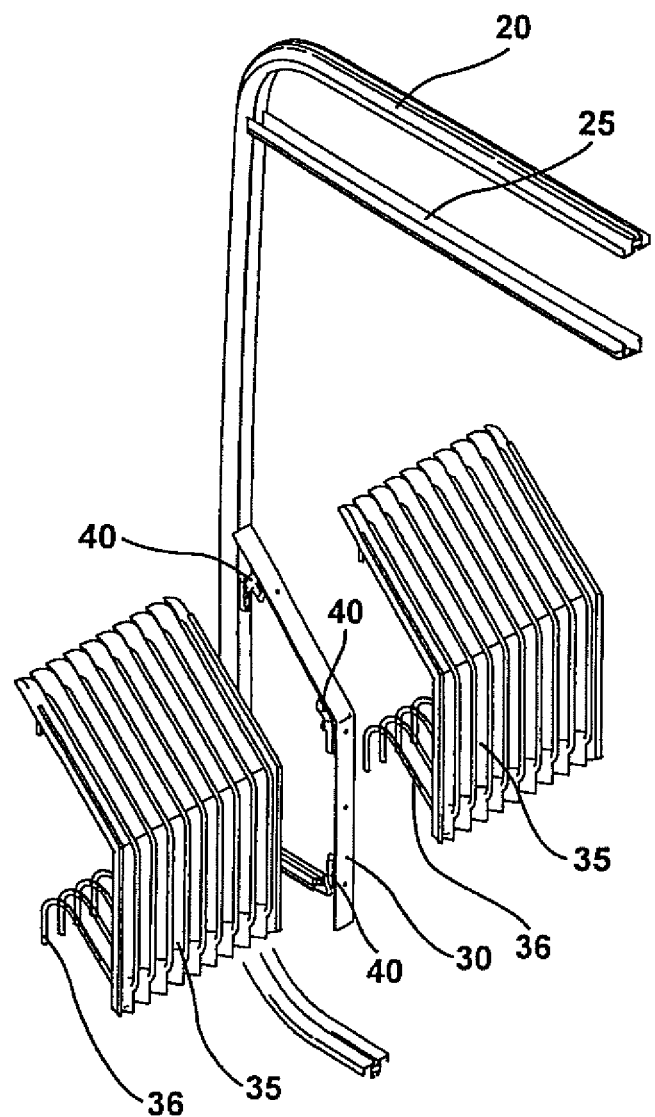
FIG. 2 shows a perspective view from the inside of the central frame with a hinted track joint cover.

The configuration of the track joint cover and its attachment to the central frame can be seen in the schematic representation according to FIG. 2. The central frame labeled 20 hereby receives the central frame labeled 30 in the lower third of the central frame 20. The cover 35 shaped as a concertina bellows extends on both sides of the mounting frame 30, wherein the wave cover 35 shaped as a concertina bellows connects with the lateral wall of the bellows by way of bellows ledges 36. This is not shown in detail and is not an object of the invention.

Furthermore, the central frame 20 includes the cross beam 25. The cross beam 25 extends along the width of the central frame and forms the junction for cover shaped as an expansion or concertina bellows (not shown) for forming the roof of the bellows.

Figure 3:
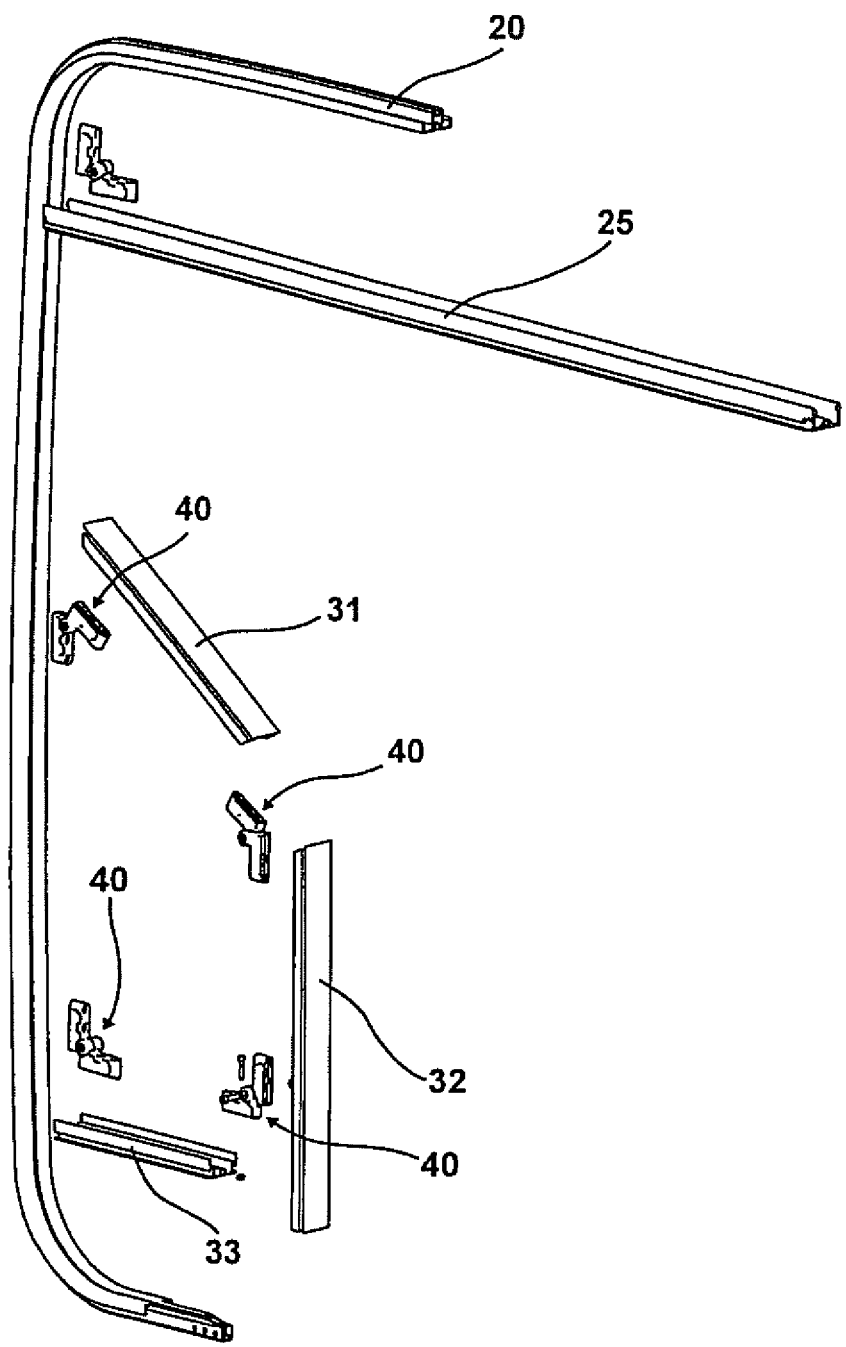
FIG. 3 shows an exploded representation of the arrangement of the articulations between the central frame on the one hand, the mounting frame on the other hand and the cross beam, as well as the connection of the individual frame members by the articulations.
Figure 4:
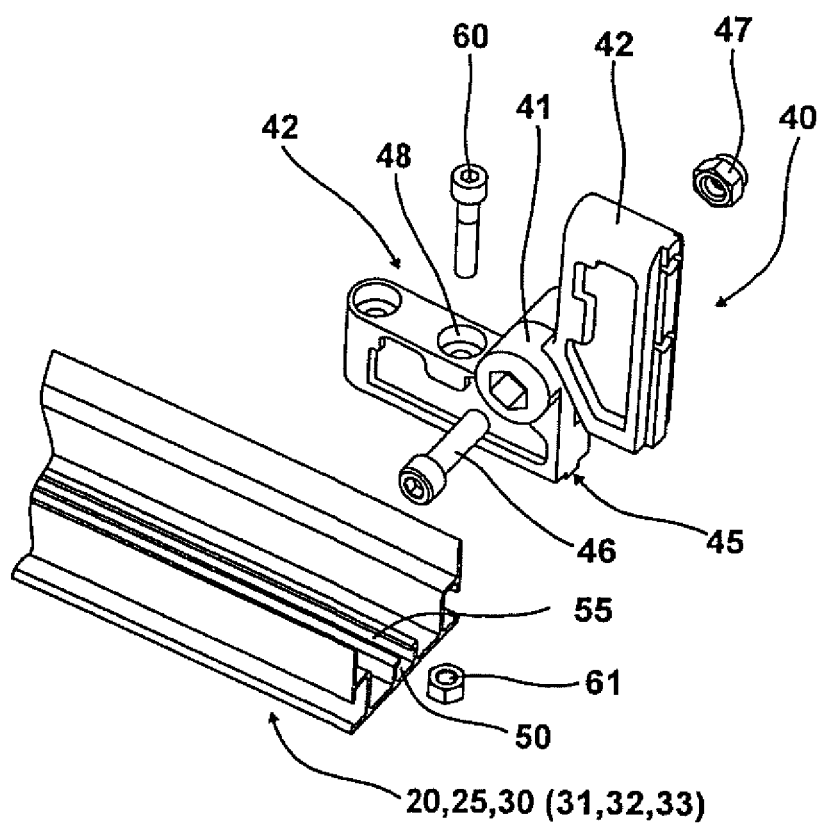
FIG. 4 exemplarily shows the connection of an articulation in the central frame configured as a rail, the cross beam or in the mounting frame formed by the frame members.

The object of the invention is the junction of the cross beam 25 to the central frame as well as the junction of the mounting frame 30 to the central frame and the connection of the individual frame members 31, 32, 33 with each other in order to form the mounting frame 30. As can be seen in FIG. 3, articulations 40 are provided to this end. The articulation 40 is configured as a hinged joint, which means that it is configured so as to be moveable in two spatial directions. FIG. 4 shows in detail the connection of the articulation in form of a hinged joint with for instance the rail that forms the central frame. The configuration of the rails for the frame members 31, 32, 33 and the cross beam 25 corresponds identically to the rail for the central frame 20. The rail for the central frame 20 has a guide 50 with a C-shaped cross section at its base. The aperture of the C-shaped guide 50 forms a longitudinal groove 55. The articulation labeled 40 as a whole shows the hinge element 41 which receives the two hinge parts 42. The axis of the hinge element 41 is formed by the screw 46 and the corresponding nut 47. Each hinge part 42 furthermore has at least one bore 48 for a screw 60, the screw 60 being in connection with the nut 61. The nut 61 is mounted in the guide 50, the groove 55 being slightly bigger than the diameter of the shaft of the screw 60, so that the hinge part and thus the hinge 40 as a whole can be connected to the rail by way of the screw 60 and the nut 61. In order to ensure a guidance of the hinge parts 42 in the rail of the central frame, the hinge part 42 has a guide flange 45 running in the longitudinal direction of the hinge part, the lateral extension of which corresponds approximately to the width of the groove 55.

This means in terms of assembly, that the nut 61 is first connected to the screw 66 with a tolerance, that the hinge 40 is then inserted for instance into the rail of the central frame, the nut 61 being hereby enclosed in the C-shaped guide 50. After positioning the hinge 40 in the central frame, the screw is pulled tight against the nut 61.

The invention claimed is:

1. A bellows assembly for a transition of an articulated vehicle of the type having two vehicles portions articulately connected to each other, the bellows assembly comprising:
   a bellows extending between the two vehicle portions;
   at least one substantially U-shaped circumferential frame;
   a cross beam disposed in a roof area of the bellows, the cross beam connected to the substantially U-shaped circumferential frame in an area of a lateral wall by an articulated coupling;
   a cover shaped as an expansion or concertina bellows; and
   at least one coupling arrangement connecting the cover to the U-shaped frame, the at least one coupling arrangement being a second articulated coupling.

2. The bellows according to claim 1, wherein the substantially U-shaped circumferential frame is a central frame of a split bellows.

3. The bellows according to claim 1, wherein the cover extends on both sides of the cross beam so as to form a roof of the bellows.

4. The bellows according to claim 1, further comprising:
   a mounting frame approximately shaped as a trapezoid; and
   the cover is disposed on both sides of the mounting frame.

5. A bellows according to claim 4, wherein the mounting frame is connected a lateral wall of the substantially U-shaped circumferential frame.

6. A bellows according to claim 4, wherein the trapezoid shaped mounting frame has a plurality of frame members which are in connection with each other by way of an articulation.

7. The bellows according to claim 1, wherein the articulation is a hinged joint.

8. A bellows according to claim 7, wherein the hinged joint is a hinge element with a hinge part at each side.

9. The bellows according to claim 1, wherein the substantially U-shaped circumferential frame has frame members, the frame members being respectively configured as a rail, the rail having a C-shaped guide at a base of the rail, which extends along the rail.

10. A bellows according to claim 9, wherein the articulated coupling is displaceably but lockably received by the C-shaped guide.

11. A bellows assembly for a transition of an articulated vehicle of the type having two vehicles portions articulately connected to each other, the bellows assembly comprising:
    a bellows extending between the two vehicle portions;
    at least one substantially U-shaped circumferential frame;
    a cover shaped as an expansion or concertina bellows;
    at least one coupling arrangement connecting the cover to the U-shaped frame, the at least one coupling arrangement being an articulated coupling;
    a mounting frame approximately shaped as a trapezoid, the trapezoid shaped mounting frame having a plurality of frame members which are in connection with each other by way of an articulation; and
    the cover is disposed on both sides of the mounting frame.

12. A bellows assembly for a transition of an articulated vehicle of the type having two vehicles portions articulately connected to each other, the bellows assembly comprising:
    a bellows extending between the two vehicle portions;
    at least one substantially U-shaped circumferential frame;
    a cover shaped as an expansion or concertina bellows; and
    at least one coupling arrangement connecting the cover to the U-shaped frame, the at least one coupling arrangement being a hinged joint.

13. The bellows according to claim 12, wherein the substantially U-shaped circumferential frame is a central frame of a split bellows.

14. The bellows according to claim 12, further comprising:
    a mounting frame approximately shaped as a trapezoid; and
    the cover is disposed on both sides of the mounting frame.

15. A bellows according to claim 14, wherein the mounting frame is connected a lateral wall of the substantially U-shaped circumferential frame.

16. A bellows according to claim 14, wherein the trapezoid shaped mounting frame has a plurality of frame members which are in connection with each other by way of an articulation.

17. A bellows according to claim 16, wherein the hinged joint is a hinge element with a hinge part at each side.

18. The bellows according to claim 12, wherein the substantially U-shaped circumferential frame has frame members, the frame members being respectively configured as a rail, the rails having a C-shaped guide at a base of the rail, which extends along the rail.

19. A bellows according to claim 18, wherein the hinged joint is a hinge element with a hinge part at each side, one of the hinge parts being displaceably but lockably received by the C-shaped guide.

* * * * *